United States Patent [19]

Crow

[11] Patent Number: 4,762,286
[45] Date of Patent: Aug. 9, 1988

[54] SPOOL REWINDER

[76] Inventor: John Q. Crow, 1609 W. 8th St., Texarkana, Tex. 75501

[21] Appl. No.: 105,506

[22] Filed: Oct. 5, 1987

Related U.S. Application Data

[63] Continuation of Ser. No. 901,379, Aug. 23, 1986, abandoned.

[51] Int. Cl.⁴ .................... B65H 54/00; B65H 75/00
[52] U.S. Cl. .................................................. 242/47
[58] Field of Search ............ 242/47, 50, 53, 18 R, 242/54 R, 60, 61, 62, 85, 96, 99, 100, 106, 129.51

[56] References Cited

U.S. PATENT DOCUMENTS

| | | | |
|---|---|---|---|
| 112,656 | 3/1871 | Vincent | 242/61 |
| 469,524 | 2/1892 | Marley | 242/61 |
| 781,982 | 2/1905 | Aal | 242/61 X |
| 899,423 | 9/1908 | Morrow et al. | 242/61 |
| 1,015,459 | 1/1912 | Riggle | 242/100 |
| 1,323,652 | 12/1919 | Smith | 242/61 |
| 1,702,971 | 2/1929 | Jeffress | 242/61 |
| 1,728,800 | 9/1929 | Makinen | 242/100 |
| 2,132,698 | 10/1938 | Price | 242/47 |
| 2,414,169 | 1/1947 | Raymond | 242/96 |
| 2,734,694 | 2/1956 | Davidson | 242/106 |
| 3,295,787 | 1/1967 | Golonka | 242/129.8 |
| 3,652,027 | 3/1972 | Wong | 242/96 |
| 3,979,833 | 9/1976 | Grundman | 33/138 |
| 4,106,719 | 8/1978 | Haverland | 242/96 |
| 4,164,332 | 8/1979 | Insch | 242/54 R |
| 4,310,126 | 1/1982 | Norleen | 242/47 |

Primary Examiner—Stanley N. Gilreath
Attorney, Agent, or Firm—Kenneth H. Johnson

[57] ABSTRACT

A device for rewinding line onto a spool comprising two substantially parallel sides spaced apart by a handle, a shaft rotatably mounted through a first side and biased toward a second side, with spool gripping means on end of the shaft adjacent to the second side for gripping a spool and forcing it against the second side which is preferably a plate or baffle having a configuration at least as large as the spool.

17 Claims, 1 Drawing Sheet

U.S. Patent — Aug. 9, 1988 — 4,762,286
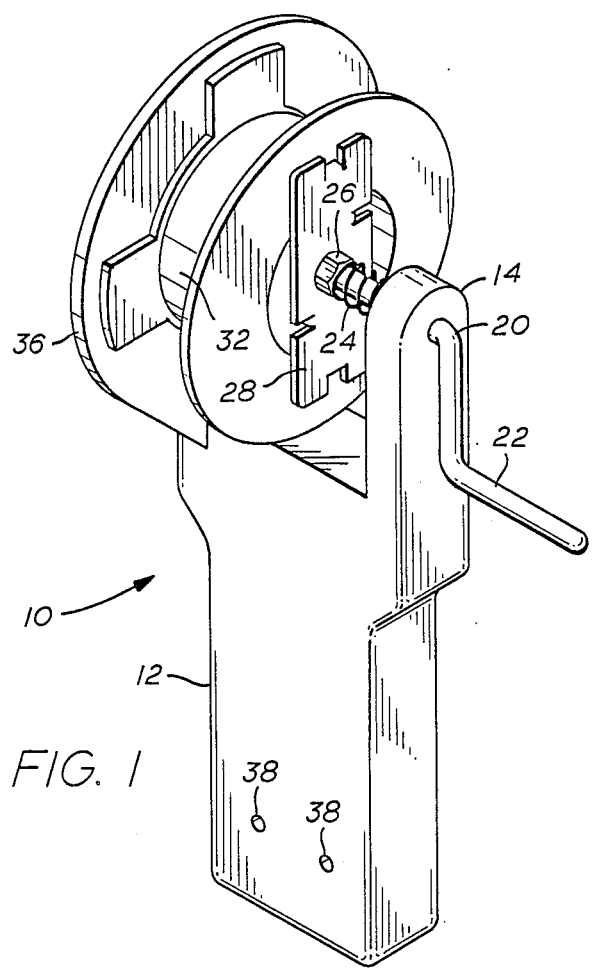
FIG. 1
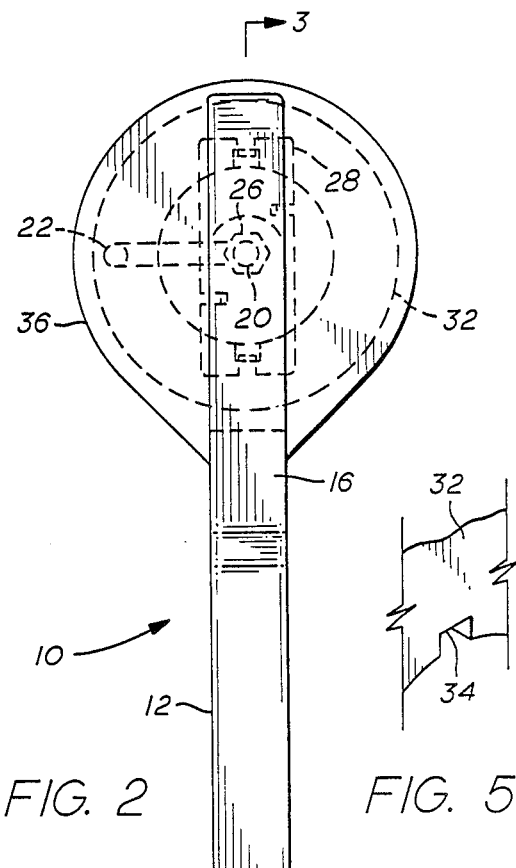
FIG. 2
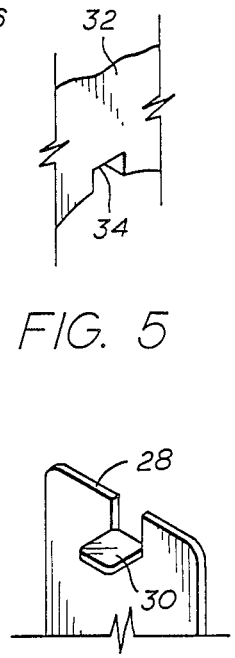
FIG. 5
FIG. 6
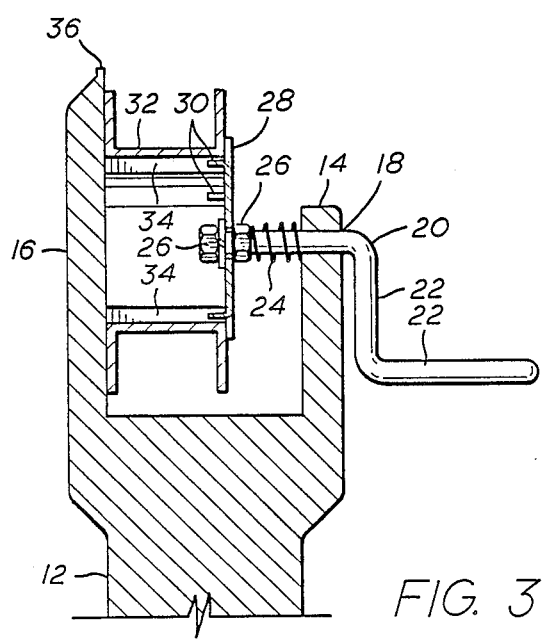
FIG. 3
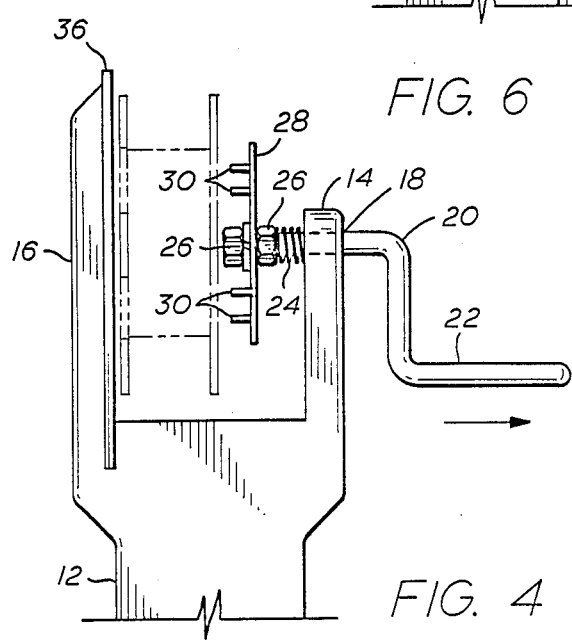
FIG. 4

SPOOL REWINDER

This application is a continuation of application Ser. No. 901,379, filed on 8-23-86, now abandoned.

BACKGROUND OF THE INVENTION

1. Field of the Invention

The present invention relates to a device for reloading spools, particularly spools used for nylon line type cutting apparatus, such as lawn edgers and trimmers.

2. Related Art

The present device is particularly useful for reloading the spool used in nylon line type edgers and trimmers. Although loaded spools may be purchased, it is far less expensive to purchase "generic" nylon line in bulk and to reload a spool. Nylon used for this purpose is relatively stiff and hard to handle, hence reloading the spool by hand requires a winder. Since this winder is intended for home use, its design and function must be simple for low cost, ease of use and safety. The present device achieves this result by biasing a member adapted to hold and position a spool toward a baffle.

There are numerous devices and apparatus which serve as reels or take-up spools for flexible lines. Many of these devices employ biasing springs in various configurations. U.S. Pat. No. 2,414,169 to Raymond discloses device to wind rope, which has a spring biased crank and shaft on which a reel is mounted. U.S. Pat. No. 3,295,787 to Golonka discloses an auxiliary fish line spool holder which comprises a support base, a crank affixed to a spool and a compression spring biased against the spool/crank combination to snub (provide frictional resistance) the rotation of the spool/crank. U.S. Pat. No. 3,652,027 to Wong discloses a kite reel which comprises a spool with a crank affixed thereon with ratchet teeth on the spool adapted to engage ratchet teeth on spring biased locking member, to allow take up while preventing inadvertent unwinding of the string. U.S. Pat. No. 3,979,833 to Grundman discloses a tape reel with two tapes storable thereon comprising two reels, which are seperately engageable with crank shaft by a pair of compression springs tightened against a clutch plate. U.S. Pat. No. 4,164,332 to Insch discloses a rewind spool for marker buoys which comprises a pair of rotary holding end cups, one of which is spring loaded to press the marker buoy against the other cup to which a crank handle mechanism is attached.

It is a feature of the present invention that it is comprised of few parts. It is an advantage of the present invention that its method of operation is very easily discerned with minimal instruction. These and other features and advantages will be apparent from the following descriptions.

SUMMARY OF THE INVENTION

Briefly, the present invention comprises a frame having two spaced, opposed and substantially parallel arms. Extending through a first of those two arms toward the second arm is a shaft having a gripping member on the end of the shaft nearest the second arm with the shaft being biased toward the second arm, whereby a spool placed on the gripping blade is biased against the second arm and thus held in place. The shaft has a crank on the end opposite to the gripping member, which is used to rotate the shaft and hence the spool for rewinding the spool with line. More preferably the second arm of the frame against which the spool is biased is a baffle, which allows the spool to slide rotationally without a hub or any type of rotatable attachment on that arm. The biasing means is conveniently a compression spring position around the shaft between the gripping plate and the first arm holding the shaft. It is also preferred that the present device have a handle or other gripping means thereon so that it may be hand held or gripped by a vice or otherwise attached to a stable object such as a table or work bench.

BRIEF DESCRIPTION OF THE INVENTION

FIG. 1 is an isometric view of the present spool rewinder.

FIG. 2 is a side elevational in plane view of the present spool rewinder.

FIG. 3 is a partial cross sectional view along line 3—3 of FIG. 2.

FIG. 4 is the view of FIG. 3 in elevation.

FIG. 5 is an isometric view of a portion of the spool.

FIG. 6 is an isometric view of a portion of the plate used to grip the spool.

DETAILED DESCRIPTION OF THE INVENTION

The spool rewinder 10 is shown isometrically in FIG. 1. Basically there is a frame comprised of the two spaced opposed and substantially parallel arm members 14 and 16. In the embodiment depicted here there are only three arms to the frame and the third arm is an elongated handle 12.

A passage or bore 18 extends through arm member 14. Extending through the bore 18 is shaft 20, which is rotatable in the bore. The shaft extends to become crank 22 on the end distal to the second arm member 16. Near the end of shaft 20 proximal to second arm member 16 a spool gripping means, plate 28, is mounted, for example, by nuts 26 on a threaded end portion such that the gripping means rotates, with rotation of the shaft (e.g., by the crank).

The plate 28 is adapted to engage with the spool 32 on which line is to be rewound, which in this instance is by prongs 30 extending outward toward the second arm member 16, some of which will engage with corresponding slots 34 (FIG. 5) in the spool. Other gripping means adapted to particular and specific spools may be employed instead of the preferred plate and prongs disclosed here. By the same token, spools may be modified, for example by cutting a suitable notch therein, in order to fit the gripping means (plate and prongs) described here.

The shaft 20 and gripping means 28 are biased toward second arm member 16 by compression spring 24 which bears against the first arm member 14 and the nut 26 and/or blade 28.

The spool 32 is held by the gripping means 28 pressed against it by the spring and forced against the second arm 16, which preferably has an enlarged surface to form a baffle 36. In this way the spool, preferably a configuration at least as large as the spool is gripped and held in place and free to rotate, when crank 22 is rotated, by sliding against the baffle. Thus there is only one engaging mechanism in the present device, whereas most spool or reel handling devices are mounted on a shaft and/or mounted to two arms. The simple yet fully functional arrangement of the present invention allows for fewer components in manufacture and fewer operating parts to fail.

In the embodiment illustrated in the drawing the gripping means is a plate or blade 28 with two prongs 30 extending in the direction of the second arm member and baffle 36. The detail of this configuration is shown in FIG. 6. FIG. 5 shows a cut out portion of a spool with a notch 34 corresponding to the prong 30. In this embodiment there will be an opposed slot 34 on the rim of spool 32 so that at least two opposed prongs 30 will engage in the corresponding notch 34 (FIG. 3).

In use the spool winder is preferably attached to a fixed object such as a table or work bench. For this purpose bores 38 are provided in handle 12 so that screws, bolts, nails or the like may be used to fasten the spool rewinder in place.

The invention claimed is:

1. A spool rewinder comprising
 (a) a frame having at least two opposed arms;
 (b) a first arm having a bore therein;
 (c) a rotatable shaft extending through said bore toward an opposed second arm, said shaft having a crank on the end distal to the second arm;
 (d) a spool gripping means on the end of the shaft proximal to the second arm, and
 (e) a biasing means for forcing said gripping means toward the second arm, whereby a spool held by said gripping means is biased against the second arm which is comprised of a stationary baffle.

2. The spool rewinder according to claim 1 wherein said baffle has a configuration at least as large as said spool held by said gripping means.

3. The spool rewinder according to claim 1 wherein said opposed arms are substantially parallel.

4. The spool rewinder according to claim 1 wherein said gripping means comprises a plate with prongs extending therefrom toward said second arm.

5. The spool rewinder according to claim 4 wherein said prongs are adapted to engage with corresponding slots in said spool.

6. The spool rewinder according to claim 1 wherein said biasing means is a compression spring.

7. The spool rewinder according to claim 1 wherein said gripping means is affixed to said shaft and rotates therewith.

8. The spool rewinder according to claim 1 wherein said frame comprises a handle means.

9. The spool rewinder according to claim 8 wherein said handle means spaces said opposed arms apart.

10. The spool rewinder according to claim 2 wherein said opposed arms are substantially parallel.

11. The spool rewinder according to claim 10 wherein said gripping means comprises a plate with prongs extending therefrom toward said second arm.

12. The spool rewinder according to claim 11 wherein said prongs are adapted to engage with corresponding slots in said spool.

13. The spool rewinder according to claim 11 wherein said biasing means is a compression spring.

14. The spool rewinder according to claim 11 wherein said gripping means is affixed to said shaft and rotates therewith.

15. The spool rewinder according to claim 11 wherein said frame comprises a handle means.

16. The spool rewinder according to claim 15 wherein said handle means spaces said opposed arms apart.

17. The spool rewinder according to claim 16 wherein said biasing means is a compression spring.

* * * * *